Figure 1:
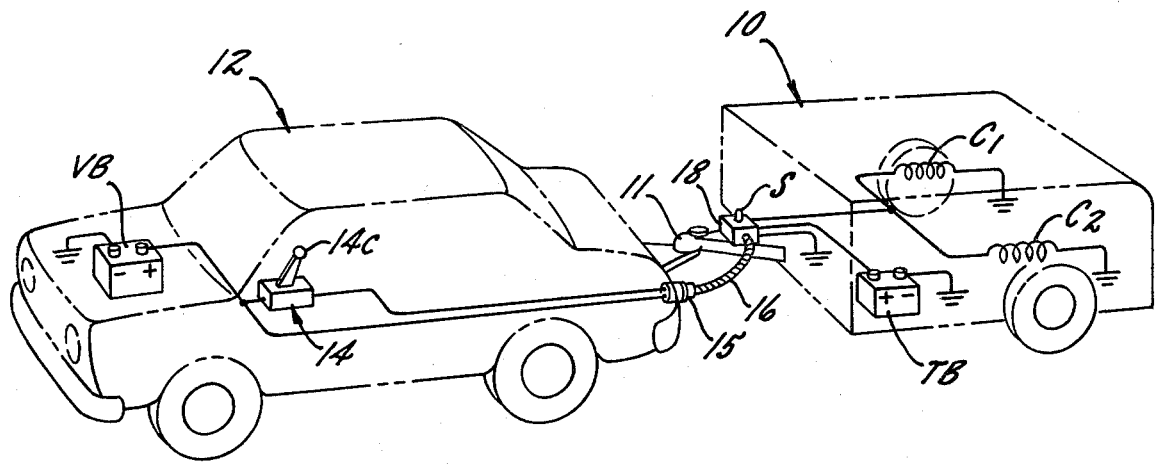

United States Patent
Wells

[11] 3,907,071
[45] Sept. 23, 1975

[54] FOOLPROOF CONTROL SYSTEM FOR TRAILER BRAKES WITH BREAK-AWAY SAFETY

[75] Inventor: William Henry Sidney Wells, Great Wyrley, England

[73] Assignee: Wellcroft (Control Gear) Ltd., Great Haywood, England

[22] Filed: May 3, 1974

[21] Appl. No.: 466,560

[52] U.S. Cl.............. 188/3 R; 188/112; 303/7; 303/20
[51] Int. Cl.² .......................................... B60T 7/20
[58] Field of Search ............ 188/3 R, 112; 303/7, 3, 303/15, 20; 280/428

[56] References Cited
UNITED STATES PATENTS

| | | | |
|---|---|---|---|
| 2,169,668 | 8/1939 | Thomas | 188/3 R |
| 2,349,167 | 5/1944 | Gunderson | 188/3 R |
| 2,867,294 | 1/1959 | Sturdivant | 188/3 R |
| 3,486,799 | 12/1969 | Greentree | 188/3 R X |

Primary Examiner—George E. A. Halvosa
Attorney, Agent, or Firm—Wolfe, Hubbard, Leydig, Voit & Osann, Ltd.

[57] ABSTRACT

A control system of the type which provides "break-away" safety action to engage the elecrically actuatable brakes in a trailer pulled by a towing vehicle, the brakes being energized under such conditions from an auxiliary battery carried in the trailer, —such system being characterized by control circuits which energize the brakes from the towing vehicle's battery if the auxiliary battery is dead or otherwise defective at the time the trailer is hitched up and towing is attempted. This apprises the user that his trailer is incapable of break-away safety action. Similarly, the present control system causes the towing vehicle battery automatically to energize the trailer brakes if the user forgets to close an anti-discharge switch (which is opened during trailer storage) before attempting to tow the trailer.

11 Claims, 2 Drawing Figures

US Patent    Sept. 23, 1975    3,907,071

FOOLPROOF CONTROL SYSTEM FOR TRAILER BRAKES WITH BREAK-AWAY SAFETY

The present invention relates in general to systems for controlling electrically actuatable brakes of trailers which are removably hitched for towing by vehicles such as automobiles and trucks. More particularly, the invention pertains to that class of trailer brake controls which are intended to function with "break-away safety", i.e., to automatically actuate the brakes from an auxiliary battery carried in the trailer in the event that the hitch breaks and the trailer thereby tends to roll dangerously out of control.

It is the general aim of the invention to overcome problems and dangerous shortcomings in break-away control systems for trailer brakes and to render such controls more foolproof.

A more specific objective is to eliminate the very strong possibility, which has existed in prior control systems, that an operator may tow his trailer with the break-away safety capability inoperative and without knowledge of that dangerous situation. Thus, it is an object to reduce the likelihood that a towed trailer, ostensibly protected by break-away braking action, may run freely and wildly out of control in the event that it does separate or tear away from the towing vehicle.

In more detail, it is an object of the invention to lock up the electrically actuatable brakes of a trailer if the trailer's auxiliary battery is dead or otherwise defective when the user attempts to tow the trailer. The operator will thus be apprised of the unsafe defect, and cannot pull the trailer until the defect is corrected.

Another object of the invention is to provide a trailer brake control system having the break-away safety feature but further including an anti-discharge switch opened by the user to prevent discharge of the auxiliary battery during periods when the trailer is purposely unhitched from a towing vehicle and stored; —and wherein the trailer brakes will be automatically locked up by electric current flow from the towing vehicle's battery if the operator should later attempt to hitch up and tow away the trailer without restoring the anti-discharge switch to its closed position which renders the break-away safety circuits effective.

Still another object is to provide both of the safeguarding functions mentioned above in a single control circuit, so that it is virtually impossible for an operator to tow a trailer if the break-away safety feature for the trailer brakes is inoperative.

Finally, it is an object to achieve the foregoing in a control system which is extremely simple, reliable and low in cost, so that it may be readily used on almost any trailer.

Figure 2:
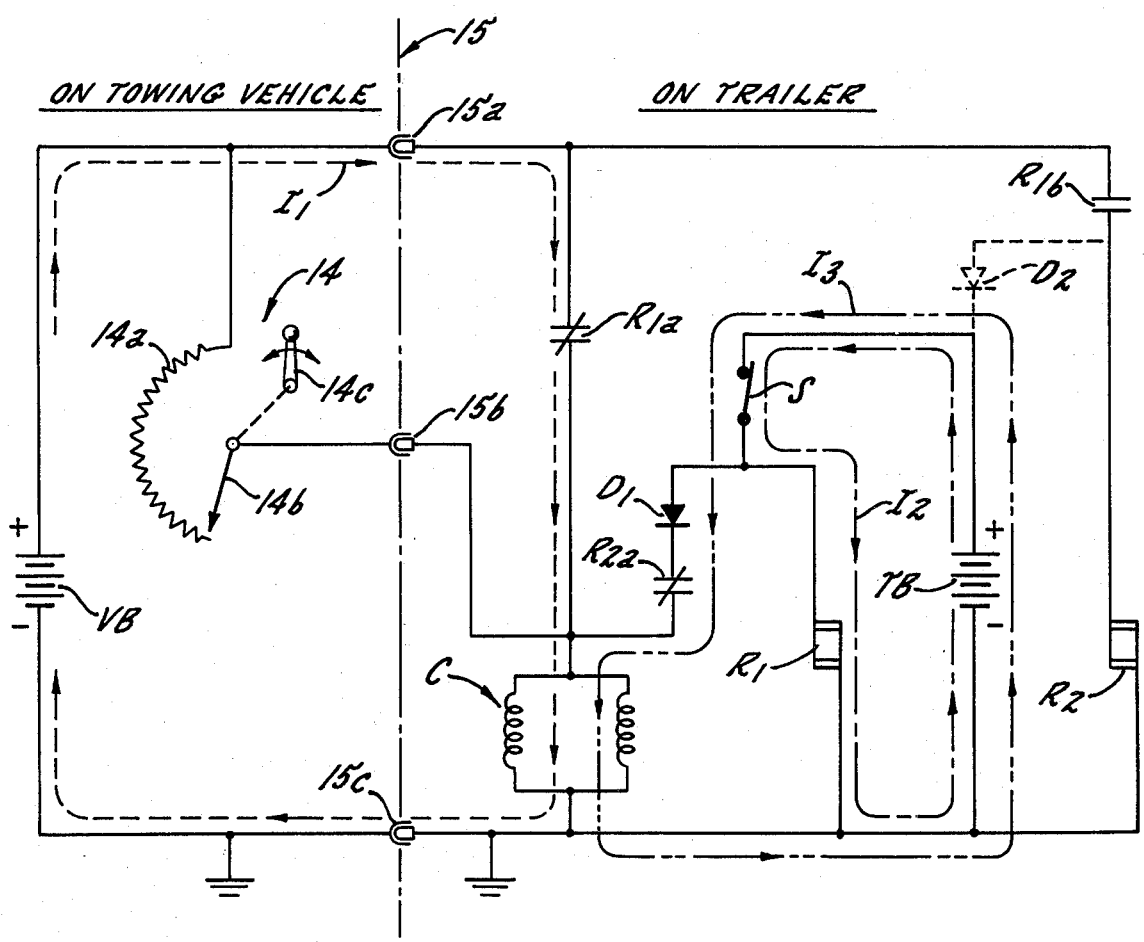

These and other objects of the invention will become apparent as the following description proceeds, taken in conjunction with the accompanying drawings, in which:

FIG. 1 is a diagrammatic illustration of a trailer equipped with electrically actuatable brakes and removably hitched to a towing vehicle; and FIG. 2 is a schematic circuit diagram of a control system constituting an exemplary embodiment of the present invention.

While the invention has been shown and will be described in some detail with reference to a particular and preferred embodiment, it is to be understood that there is no intention thus to limit the invention to such detail. On the contrary, it is the intention here to cover all alternatives, modifications and improvements which fall within the spirit and scope of the invention as defined by the appended claims.

Referring to the diagrammatic perspective in FIG. 1, a trailer 10 is shown coupled by a removable hitch 11 to a towing vehicle 12. The latter may be an automobile, truck or tractor and will here be referred to as simply the vehicle. In well known and conventional fashion, the towing vehicle carries a voltage source, here a battery VB, connected into its electrical system, and also a hand or foot controller 14 comprising a rheostat or resistor 14a (FIG. 2) along which a wiper 14b is slidable by the setting of a control lever 14c.

When the hitch 11 is hooked up, the user joins the plug and socket parts of a disengageable, multi-terminal electrical connector 15 at the rear of the vehicle, so that connections are established for controllable energization of brake coils C1 and C2 on the trailer 10, as well as connections for the trailer lights and other electrical components. The connector 15 is here shown as completing electrical connections via a cable 16 to a control unit 18 mounted in any suitable location on the trailer 10.

Because the details of brake construction are well known and per se form no part of the present invention, it will suffice to note that the wheels of the trailer 10 are equipped with brakes, preferably of the electromagnetic type, respectively associated with the coils C1 and C2. When energized or excited by electric current, these coils cause the wheel brakes to be actuated or engaged, to produce braking torque which is preferably proportional to the magnitude of the exciting current. During normal towing operations, as hereinafter described, the coils C1 and C2 are variably energized by current flow through the connector 15 and the cable 16 according to the vehicle driver's setting of the lever 14c. It will suffice to refer to the coils C1 and C2 as a single coil C, inasmuch as the two coils are normally connected in parallel and, in any event, the invention to be described can be applied to a single brake having a single coil, or to several brakes controlled by only one coil.

It has been a recognized danger that the trailer 10 might be pulled or "broken away" from the vehicle 12 if the hitch 11 fails on hills, rough roads or in an accidental collision. This would, of course, separate the connector 15 (or equivalently break the cable 16) to leave the brake coils with no source of current from the vehicle battery, and the brakes fully released. Even a heavy two wheel trailer (and all the more, a four wheel trailer) may roll wildly out of control and possibly create severe damage or injury in such circumstances. Thus, it has been an accepted practice to provide an auxiliary battery TB on the trailer and to connect it with conventional control circuits which act to fully energize the brake coil C from that auxiliary battery whenever the trailer, for any reason, breaks away from the towing vehicle.

In such break-away control systems, a serious problem arises. The auxiliary battery TB may (and often will) be neglected for long periods when tthe trailer is stored. It thus may self-discharge, dehydrate, degrade due to aging, or otherwise become defective and incapable of supplying the necessary energizing current to the brake coils C. Because emergency break-aways are rare (although serious when they occur), the average user is apt to forget that the battery TB is even in the trailer and vital to road safety. If he tows the trailer with the dead or ineffective auxiliary battery TB, he will not even be aware that he is without any break-away safety capability for the trailer.

In accordance with the present invention, the trailer brakes are locked by energizing current flow from the towing vehicle voltage source if the user attempts to hitch up and tow away the trailer 10 when a circuit for energizing the brake coil from the battery TB upon break-away is, for some reason, incapable of producing such energizing, and specifically if the battery TB is dead or otherwise defective. The manner in which this is accomplished will become clear from the ensuing description of FIG. 2 which schematically illustrates the vehicle voltage source as a battery VB, the auxiliary trailer battery TB, and the separable electrical connector 15 having three pairs of mating disengageable terminals 15a, 15b and 15c, the voltage of the battery VB appearing between the terminals 15a and 15c when the connector is engaged. The rheostat 14a for variably energizing the trailer brake coil C under normal driving conditions is shown in FIG. 2 as having one end connected to the positive terminal of the battery VB and as having the wiper 14b connected through the terminals 15b directly to the coil C and thence to the negative terminal of that battery. While the modulated or variable energization of the brake coil C forms no part of the present invention, it will be understood that by movement of the lever 14c and wiper 14b, the driver of the towing vehicle may under ordinary circumstances thus controllably apply the trailer brakes by varying the energizing current through the coil C. The remainder of the control circuits shown in FIG. 2 may conveniently be contained in the housing of the control unit 18 (FIG. 1).

In carrying out the invention, first circuit means are provided to supply energizing current through the brake coil C via the joined connector terminals 15a from the vehicle voltage source VB when the user engages the two separable parts of the connector 15 at the time he couples the hitch 11. As here shown, such circuit means includes a normally conductive controlled switching device in the form of normally closed relay contacts R1a. Unless the contacts R1a are opened, brake coil energizing current will flow along the path $I_1$ from the positive terminal of the battery VB, the terminals 15a, through the brake coil C, and thence to the negative terminal of that battery, after the two separable parts of the connector 15 are engaged.

Secondly, means are provided to disable the first circuit means and interrupt the current flow through the path $I_1$ if the second circuit means (to be described) for energizing the coil C, upon break-away, is capable of functioning to produce such energization; and specifically if the trailer battery TB is not discharged or otherwise defective. As here shown in FIG. 2, a relay coil R1 is connected in series across the battery TB through a closed switch S, so that normally the relay R1 will be actuated by current flow in the path marked $I_2$, providing that the battery TB is not unduly discharged or otherwise defective. When energized with sufficient current, the relay coil R1 actuates the associated contacts R1a, thereby opening the latter to disable or render non-conductive the first circuit means. The relay coil R1 is here employed as a sensing means responsive to the condition of the battery TB for rendering the switching device R1a non-conductive if the battery is not defective. For this purpose the coil R1 constructed to have a minimum voltage threshold which must be applied to it before it actuates its controlled contacts R1a and R1b. While other battery condition sensing devices may be utilized, the voltage threshold relay R1 is illustrative since it will respond only if the condition of the battery is not below standard, i.e., will not respond unless the voltage provided at the terminals of the battery TB is sufficiently high to indicate that such battery is substantially fully charged and therefore in a non-defective condition, capable of supplying actuating current to the brake coil C. It will thus be understood that if the battery TB is defective, the relay coil R1 will not actuate the normally closed contacts R1a and current flow along the path $I_1$ from the vehicle battery VB will lock up the brakes associated with the coil C. Therefore, if the driver of the towing vehicle attempts to hook up and pull away the trailer when the auxiliary battery TB is defective, the trailer brakes will be locked and the driver will be immediately apprised of this situation due to the heavy drag of the trailer 10 on the vehicle 12. He will have to correct the difficulty by recharging or replacing the battery TB before he will be able to take the trailer 10 out on the highway. On the other hand, if the auxiliary trailer battary TB is not defective, then the relay R1 will be energized sufficiently by that battery to actuate and open the contacts R1a, thereby disabling the first circuit means, interrupting the current flow through the path $I_1$ and leaving the brakes of the trailer 10 released.

Further in keeping with the present invention, second circuit means are provided for energizing the brake coil C by current flow from the auxiliary batter TB. Such circuit means are here illustrated in FIG. 2 as including the closed switch S, a diode D1, and a controlled switcing device in the form of nomally closed contacts R2a—forming a series circuit, including the coil C, across the terminals of battery TB and through which energizing current may flow along the path labeled $I_3$. It is current flow in this series circuit which will energize the brake coil and engage the trailer brakes in the event of an emergency break-away of the trailer 10.

There are also provided, however, means for disabling the second circuit means and making it normally incomplete, when and so long as the trailer 10 is operatively hitched to the towing vehicle and has not broken away. It will be understood, of course, that when the trailer is fully and properly hitched, the connector 15 will be engaged; but if the hitch fails and the trailer breaks away from the towing vehicle, then the two joined parts of the connector 15 will be pulled apart. With those part normally engaged as illustrated in FIG. 2, and if the relay coil R1 has been sufficiently energized to actuate its contacts R1a, as explained above, then the relay contacts R1b will be closed, thereby creating a current path for excitation of a relay coil R2 from the vehicle battery VB. With the relay R2 energized, its controlled contacts R2a will be opened, and thus the second circuit means will be disabled to interrupt the current flow path $I_3$. In other words, the switching device formed by the contacts R2a is rendered non-conductive only if both (i) the first circuit means is disabled, i.e., contacts R1a are open and thus contacts R1b are closed, and (ii) voltage from the vehicle source is transmitted via joined terminals 15a, 15c to the coil R2. This condition will prevail so long as the trailer is towed normally along roads or highways, with the controller 14 effective. If, however, the trailer breaks away, and the parts of the connector 15 are pulled apart, then the excitation path through relay contacts R1b for the relay R2 will be interrupted, and the contacts R2a will close to complete the conductive path $I_3$. The auxiliary battery TB will supply energizing current through the coil C to automatically engage the trailer brakes. The trailer, therefore, will not roll wildly out of control after it breaks away from the vehicle.

The diode D1 is included in the path $I_3$ merely to prevent the actuation of relay coil R1 by current flowing from battery VB, reheostat 14, wiper 14b and terminals 15b, in the event that the wiper 14b is set at a nearly full clockwise position when the connector 15 is joined. Only the batery TB can cause pick-up of relay R1.

The switch S shown in FIG. 2 may be called an "anti-discharge" switch. It is preferably located with its actuating lever or slide button disposed on the exterior of the housing for the control unit 18 (FIG. 1). When the user of the trailer parks the latter for storage in a garage or parking lot and disconnects the separable connector 15, then the normally closed relay contacts R1a will under those circumstances be closed. By opening the switch S, the user may interrupt or disable the second circuit means described above, thereby preventing current flow from the battery TB along the path $I_3$. Thus, when the trailer 10 is stored, needless current drain and discharge of the battery TB is prevented.

This poses a further problem, however, in that the user of the trailer 10 might possibly hitch up the trailer to a towing vehicle, engage the two parts of the separable connector 15 and pull the trailer out onto the road or highway—after having forgotten to manually close the switch S. Thus, he would be unaware that the energizing circuit for emergency break-away operation of the trailer brakes had been left in a disabled condition.

In keeping with still another feature of the present invention, provision is made to automatically lock up the trailer brakes in the event that the user forgets to reclose the anti-discharge switch S after the latter has been opened during storage of the trailer. As here shown, this is accomplished by providing the first circuit means above described, including the normally closed relay contacts R1a, for energizing the brake coil C by current flow from the vehicle battery VB through the joined terminals 15a, together with means for disabling such first circuit means only if the anti-discharge switch S is closed. Again, the first circuit means will be disabled only if the relay coil R1 is energized to actuate the contacts R1a, and this can happen (even though the battery TB is fully charged and operative) only if the switch S is closed. In other words, the series circuit for energizing the relay R1 from the battery TB includes the switch S in series, and if that switch is left open, the relay R1 cannot be actuated, the relay contacts R1a will remain closed, and the coil C will be energized by current flow via path $I_1$ from the voltage source VB. Thus, the operator will immediately be apprised when he finds the trailer brakes locked if he attempts to tow away the trailer 10 after having forgotten to reclose the anti-discharge switch S when he coupled the hitch 11.

The present invention thus brings to the art an improved safety control system for trailer brakes which is essentially foolproof. If the operator attempts to hook up and tow away a trailer having a defective auxiliary battery TB, the trailer brakes will be locked up by current flow from the voltage source of the towing vehicle. Moreover, when the trailer is stored for long periods of time, the anti-discharge switch S may be opened to prevent the needless discharge of the auxiliary battery TB through the brake coil C. But if the user should attempt to hook up and tow away the trailer 10 with that anti-discharge switch in its opened, rather than its closed, condition (and therefore with the break-away safety function disabled), the trailer brakes will also be locked up by energizing current flow from the vehicle voltage source. If, however, both conditions are satisfied, i.e., the auxiliary trailer battery TB is operative and the anti-discharge switch has been closed, then the user may readily tow away the trailer because the brake coil C will not be energized to lock up the trailer brakes. Under these circumstances, normal modulated actuation of the trailer brakes may be effected by means of the driver's control lever 14c and the rheostat 14a, 14b. And finally, in the event that the trailer breaks away while being towed, then the second circuit means here described will cause automatic energization of the trailer brake coil C from the auxiliary battery TB. This will occur because break-away of the trailer will separate the connector 15, thereby deenergizing the relay coil R2 by interrupting its excitation from the towing vehicle voltage source VB, whereupon the relay contacts R2a will reclose to permit current flow from battery TB via the path $I_3$ to energize the coil C and engage the trailer brakes.

The present system lends itself readily to recharging of the battery TB from the generator (not shown) associated with the electrical system and the battery VB of the vehicle while the trailer is being towed. To achieve this, it is only necessary to add a diode D2, as shown, so that such charging current may flow through terminals 15a, the contacts R1b when closed, and thence reversely through battery TB. The unidirectional conductive nature of the diode D2 prevents the energization of the coil R2 unless and until the relay coil R1 is adequately excited by current flow solely from the battery TB.

The control system in the preferred form here described is not only essentially foolproof, but also failsafe in its nature. If either of the relays R1 or R2 should malfunction, i.e., fail to pick-up and actuate its associated contacts, then the trailer brakes will be locked to apprise the vehicle driver that something is wrong. That is, if relay R1 fails to operate (even though battery TB is not defective) contacts R1a will remain closed and the coil C will be energized by current flow over path $I_1$. And if relay R1 actuates properly, but if relay R2 fails to actuate, then contacts R2a will remain closed, and the coil C will be energized by current flow from battery TB via path $I_3$ (or indeed by current flow via R1b, D2, S, D1 and R2a if the diode D2 is used in the control system).

It is to be understood that the present invention may be embodied by using any of a variety of well known equivalent electrical components. Thus, the relay contacts R1a and R2a may here be viewed as controlled switching devices which are controlled respectively by means (coil R1) responsive to the condition of the battery TB and switch S, and means (coil R2) responsive to the proper hitching (engagement of terminals 15a and 15c) of the vehicle and the connector 15. As one example of a well known alternative, however, the relay contacts R1a, R2a and R1b may be replaced by the emitter-collector paths of conventional transistors which are arranged, in well known fashion, to be turned on or off by control voltages applied to their respective bases. Thus, while a particular and specific exemplary embodiment of the present invention has here been shown and described in detail with reference to the relays, other alternatives such as transistors or silicon controlled rectifiers may readily be substituted by those skilled in the art.

I claim:

1. In a control system for a brake of a trailer which is adapted to be removably hitched to a towing vehicle, said brake being engaged when an associated coil is energized by current flow therethrough, said vehicle carrying a voltage source, and said trailer carrying an auxiliary battery, the combination comprising
   a. a disengageable connector having separable parts joined by the user when the trailer is hitched to the vehicle and, when joined, applying the source voltage across terminals on the trailer,
   b. first circuit means, including a conductive path via said terminals, for energizing said coil by current flow from the voltage source,
   c. means responsive to the condition of said battery for disabling said first circuit means when said connector parts are joined if said battery is not defective, and
   d. means for connecting said battery in series with said coil when the trailer breaks away from the vehicle,
whereby the trailer brake is engaged under circumstances where said connector parts are joined and the battery is defective due to a discharged state or other reasons and the emergency break-away action of said means (d) would therefore be ineffective.

2. For use with a trailer adapted for removable hitching to a towing vehicle containing a voltage source, the trailer having a brake actuatable by the energization of an associated coil and having an auxiliary battery, a control system comprising, in combination
   a. a multi-terminal disengageable connector having separable parts joined by the user when the trailer is hitched to the vehicle and pulled apart when and if the trailer breaks away from the vehicle,
   b. first circuit means, including a conductive path through joined terminals of said connector, for energizing said coil by current flow from the voltage source,
   c. means responsive to the condition of said battery for disabling said first circuit means if said battery is not defective,
   d. second circuit means, including a conductive path, for energizing said coil by current flow from said battery, and
   e. means for disabling said second circuit means if the trailer is operatively hitched to the vehicle.

3. The combination set forth in claim 2 wherein said first circuit means includes a normally conductive controllable switching device serially connected in the conductive path, and said means (c) includes sensing means responsive to the condition of said battery for rendering said switching device non-conductive if the battery is not defective.

4. In a control system for a brake of a trailer which is adapted to be removably hitched to a towing vehicle, said brake being engaged when an associated coil is energized by current flow therethrough, said vehicle carrying a voltage source, and said trailer carrying an auxiliary battery, the combination comprising
   a. a disengageable connector having separable parts joined by the user when the trailer is hitched to the vehicle and, when joined, applying the source voltage across terminals on the trailer,
   b. a first circuit means, including a conductive path through joined terminals of said connector, for energizing said coil by current flow from the voltage source,
   c. means for sensing the condition of said battery,
   d. means controlled by said sensing means for interrupting the conductive path of said first circuit means when the sensed condition of said battery is not below standard,
   e. second circuit means, including a normally incomplete conductive path, for energizing said coil by current flow from said battery, and
   f. means for completing the conductive path of said second circuit means when the trailer breaks away from hitched connection to the vehicle.

5. In a control system for an electric brake of a trailer which is adapted to be removably hitched to a towing vehicle, said brake being engaged when an associated coil is energized by current flow therethrough, said vehicle carrying a voltage source, and said trailer carrying an auxiliary battery, the combination comprising
   a. a disengageable connector having separable parts joined by the user when the trailer is hitched to the vehicle and, when joined, applying the source voltage across terminals on the trailer,
   b. means forming a series circuit for supplying current from said battery through said coil when the trailer is unhitched or broken away from the vehicle,
   c. an anti-discharge switch in said series circuit, said switch intended to be open when the trailer is unhitched from the vehicle for storage, thereby to prevent discharge of said battery,
   d. first circuit means, including a conductive path via said terminals, for energizing said coil by current flow from the voltage source when said connector is joined, and
   e. means responsive to the state of said anti-discharge switch for disabling said first circuit means when said anti-discharge switch is closed and for enabling said first circuit means when said anti-discharge switch is open, said means (e) including
      e1. a normally conductive controllable switching device in the conductive path of said first circuit means,
      e2. means for passing current through said anti-discharge switch, when closed, over a path exclusive of said coil, and
      e3. means responsive to current flow through the latter path for rendering said switching device non-conductive and responsive to the absence of current flow through the latter path for rendering said switching device conductive,
whereby said brake is locked if a user attempts to tow the trailer with the anti-discharge switch open.

6. For use with a trailer adapted for removable hitching to a towing vehicle containing a voltage source, the trailer having a brake actuatable by energization of an associated coil and having an auxiliary battery, a control system comprising, in combination a. a multi-terminal disengageable connector having separable parts joined by the user when the trailer is hitched to the vehicle and pulled apart when and if the trailer breaks away from the vehicle, b. an anti-discharge switch intended to be opened or closed by the user when the trailer is (i) unhitched for storage or (ii) hitched for towing, respectively, c. first circuit means including a conductive path through joined terminals of said connector for energizing said coil by current flow from said source, d. means responsive to the state of said switch and to the condition of said battery for disabling said first circuit means when and so long as (i) said switch is closed or (ii) said battery is not defective, e. said circuit means including a conductive path for energizing said coil by current flow from said battery, and f. means for disabling said second circuit means when and so long as (i) said switch is open or (ii) said connector parts are joined.

7. The combination set forth in claim 6, wherein said means (d) includes a controlled switching device serially connected in the path of said first circuit means, means for sensing the condition of said battery, and means for rendering said device non-conductive in response to said sensing means detecting that said battery is not defective.

8. The combination set forth in claim 7, wherein said means (d) further includes said switch for connecting said sensing means to said battery, whereby said switching device is conductive so long as said switch is open.

9. The combination set forth in claim 6 wherein the conductive path constituting a part of said second circuit means includes said switch in serries, whereby said second circuit means is disabled so long as said switch is open and said battery cannot discharge through said coil.

10. The combination set forth in claim 6 wherein said means (f) include a controlled switching device serially connected in the conductive path of said second circuit means, said controlled switching device including a voltage-responsive element which when excited renders that device non-conductive, and circuit means for applying the voltage of said source to said element via said connector, whereby upon separation of said connector parts said device becomes conductive.

11. In a control system for the brake of a trailer which is adapted to be removably hitched to a towing vehicle, said brake being engaged with an associated coil is energized by current flow therethrough, said vehicle carrying a voltage source, and said trailer carrying an auxiliary battery, the combination comprising a. a disengageable connector having separable parts joined by the user when the trailer is hitched to the vehicle and, when joined, applying the source voltage across terminals on the trailer, b. means for energizing said coil by current flow from said battery when the trailer breaks away from the vehicle, but such means being incapable of producing such energizing under some conditions, c. first circuit means, including first and second parallel conductive paths via said terminals for energizing said coil by current flow from said voltage source through either path when said connector is joined, adjustable means in said first path for varying the degree of energization of said coil, and d. means responsive to conditions in said means (b) for disabling said second path when said means (b) is capable of functioning.

* * * * *